US006733554B2

(12) United States Patent
Ribera Salcedo

(10) Patent No.: US 6,733,554 B2
(45) Date of Patent: May 11, 2004

(54) RE-CIRCULATING SYSTEM FOR DE-DUSTING AND DRY GAS CLEANING

(76) Inventor: Romualdo Luis Ribera Salcedo, Faculdade de Engenharia da Universidade do Porto, Departamento de Engenharia Quúnica, Rua Dr. Roberto Frias, P-4200-465 Porto (PT)

( * ) Notice: Subject to any disclaimer, the term of this patent is extended or adjusted under 35 U.S.C. 154(b) by 0 days.

(21) Appl. No.: 10/149,675

(22) PCT Filed: Dec. 13, 2000

(86) PCT No.: PCT/PT00/00013

§ 371 (c)(1),
(2), (4) Date: Jun. 13, 2002

(87) PCT Pub. No.: WO01/41934

PCT Pub. Date: Jun. 14, 2001

(65) Prior Publication Data

US 2002/0178703 A1 Dec. 5, 2002

(30) Foreign Application Priority Data

Dec. 13, 1999 (PT) ................................................ 102392

(51) Int. Cl.[7] .......................... B01D 45/12; B01D 50/00

(52) U.S. Cl. .......................... 55/338; 55/345; 55/459.1; 55/467; 55/468; 55/DIG. 30

(58) Field of Search .......................... 55/338, 339, 340, 55/315, 345, 459.1, 460, 467, 468, DIG. 30

(56) References Cited

U.S. PATENT DOCUMENTS

| | | | | |
|---|---|---|---|---|
| 1,928,702 A | * 10/1933 | O'Mara | ....................... | 55/338 |
| 2,571,331 A | * 10/1951 | Blomen | ....................... | 55/322 |
| 3,210,061 A | * 10/1965 | Nogiwa | ....................... | 266/172 |
| 5,180,486 A | 1/1993 | Smolensky | | |

FOREIGN PATENT DOCUMENTS

| | | |
|---|---|---|
| BE | 538944 | 6/1955 |
| DE | 3811400 | 10/1989 |

OTHER PUBLICATIONS

Patent Abstracts of Japan, vol. 1998, No. 10, Aug. 31, 1998 & JP 10 118531 A (Mitsubishi Heavy Ind Ltd.), May 12, 1998.

* cited by examiner

*Primary Examiner*—Robert A. Hopkins
(74) *Attorney, Agent, or Firm*—Wenderoth, Lind & Ponack, L.L.P.

(57) ABSTRACT

A re-circulation system for de-dusting and dry gas cleaning, comprises a straight-through cyclone concentrator, a reverse-flow cyclone collector upstream of the straight-through cyclone concentrator, and a re-circulation mechanism interconnecting the reverse-flow cyclone separator and the straight-through cyclone concentrator. When gas flows from the reverse-flow cyclone separator through the straight-through cyclone concentrator a portion of the gas is re-circulated by the re-circulation mechanism to the reverse-flow cyclone collector.

12 Claims, 5 Drawing Sheets

RE-CIRCULATING SYSTEM FOR DE-DUSTING AND DRY GAS CLEANING

BACKGROUND OF THE INVENTION

The present invention, shown schematically in FIG. 1, is a re-circulation system employing cyclones, and belongs to a class of equipment used for de-dusting and dry-gas cleaning.

As a matter of fact, cyclones are de-dusters used in many types of industries with two purposes: removal of particulate matter emitted from processes, before release to an atmosphere (pollution control and/or raw material recovery); or as reactors for removal of acid components from flue gases by dry injection of appropriate sorbents. These reactors are frequently followed by bag filters for fine particle recovery.

Industrial cyclones vary in size and shape, with the most common being of the reverse-flow type.

The first reverse-flow cyclones date from the 19th century, and their design has evolved mostly from empirical observation.

Theoretically, cyclone efficiency increases with gas flow rate, but in practice there is a limit beyond which efficiency decreases. This is due to saltation or re-entertainement (Licht, 1980), much like what happens in sand dunes which are blown by a strong wind.

To remedy this problem, partial gas re-circulation has been proposed, using a fan or appropriate ejector 3' in combination with a reverse-flow cyclone 1' (FIG. 2, Berezowski and Warmuzinski, 1993). Similar examples may be observed in U.S. Pat. No. 3,254,478.

To increase cyclone efficiency, cyclones may be connected in series, as long as correctly designed, but with a cost of increased pressure drop and operating costs (Salcedo, 1993).

Thus, cyclone re-circulation systems were developed, which included a straight-through cyclone (from now on referred to as a concentrator) upstream from a reverse-flow cyclone (from now on referred as a collector), with partial re-circulation from the collector to the concentrator, using some fan. Such a system is schematically shown in FIG. 3 (Crawford, 1976; Svarovsky, 1981; Wysk et al., 1993). This system is disclosed in U.S. Pat. No. 5,180,486. Gas to be treated enters the concentrator 2" through a tangential entry, rises in a vortex flow and is divided in two parts: one that escapes to an atmosphere and the other that enters the collector 1", also through a tangential entry. Here the gas follows a descending vortex, until it changes direction due to an established pressure field (thus the name of reverse-flow) and exits from a top of the collector via a cylindrical tube, a vortex finder, of some appropriate length. As they follow the descending vortex, solid particles are thrown against a wall of the collector due to centrifugal forces, and then fall to a bottom of the collector, thereby being separated from the gas. The gas and remaining particles exiting the collector are re-cycled to the concentrator via a centrifugal fan 3".

These systems may be much more efficient than single reverse-flow cyclones (collectors), and their collection efficiency is given by:

$$\eta = \frac{\eta_{con}\eta_{col}}{1 - \eta_{con} + \eta_{con}\eta_{col}} \tag{1}$$

where $\eta_{con}$ and $\eta_{col}$ are concentrator and collector efficiencies, respectively. This equation shows that for $\eta_{con} \leqq \eta_{col}$, system efficiency is always lower than that for a singe collector ($\eta_{col}$), but that for $\eta_{con} > \eta_{col}$, system efficiency is always larger than that for a single collector. Thus, these systems are only interesting whenever concentrator efficiency is significantly higher than collector efficiency. This concept is schematically shown in FIG. 4.

Summing up, there are in the marketplace cyclone re-circulation systems that may be, under some circumstances, significantly more efficient than single reverse-flow cyclones, which use a concentrator upstream from a collector, with re-circulation from the collector to the concentrator through an appropriate fan or ejector. However, as shown, they are not always more efficient than single collectors.

There are also gas cleaning devices that employ dry sorbent injection of finely divided powders, but they still have high investment costs (Carminati et al., 1986; Heap, 1996; Fonseca et al., 1998).

The present invention has as a main objective to increase collection efficiency of cyclone dedusters with re-circulation, even when concentrator efficiency drops below collector efficiency.

It is also an objective of the present invention to make available a highly efficient system for de-dusting and acid gas cleaning of flue gases.

Additional objectives will become obvious following the remaining description and from the proposed claims.

SUMMARY OF THE INVENTION

The proposed objectives are achieved by considering a system of re-circulation cyclones, where a collector is located upstream of a concentrator, and re-cycling is performed by an appropriate fan, venturi or ejector.

With an objective of obtaining cyclone systems which are more efficient than those available in the marketplace, but with similar investment and operating costs, which may be used at high temperatures and pressures or for dry gas cleaning, a study has been initially made with regard to a most efficient configuration.

It is verified that, although system components are essentially those from the prior art, inverting their relative position makes a resulting system always more efficient than single reverse-flow cyclones or than re-circulation systems with a concentrator located upstream from a collector. Because a concentrator and collector are in series, investment and operating costs are similar to those associated with re-circulation systems with a collector downstream from a concentrator. Employing a venturi for re-circulation makes it possible to use this resulting system at very high temperatures (>1000° C.). For larger flow rates, appropriate fans or ejectors may be used. These systems may also be used for acid dry gas cleaning, since reverse-flow cyclones may be excellent reactors for this purpose.

By simple theoretical arguments, a solution to this problem is a system where a collector is located upstream from a concentrator. Global efficiency for this system is given by:

$$\eta = \frac{\eta_{col}}{1 - \eta_{con} + \eta_{con}\eta_{col}} \quad (2)$$

Because the denominators of equations (1) and (2) are the same, and because the numerator of equation (2) is always larger than that of equation (1), efficiency of the resulting system is always higher than that of re-circulation systems available in the marketplace. This concept is shown in FIG. 5.

As previously stated, besides of the resulting system efficiency being always larger than that of the prior art system as shown in FIG. 3, where the concentrator is located upstream from the collector, for comparable geometries and sizes—as was previously seen by comparing equations (1) and (2) and also by comparing FIGS. 4 and 5—the resulting system has an efficiency always larger than that of a single collector, unlike what happens whenever a concentrator is located upstream from a collector, as referred to above.

The resulting system may also be used in advantage over existing reactors for dry gas cleaning (spray dryers or venturi scrubbers) and for acid gas cleaning (HCl, HF, $SO_2$ and $NO_x$), where very compact and high efficiency units may be designed.

DETAILED DESCRIPTION OF THE PREFERRED EMBODIMENTS

Figure 1:
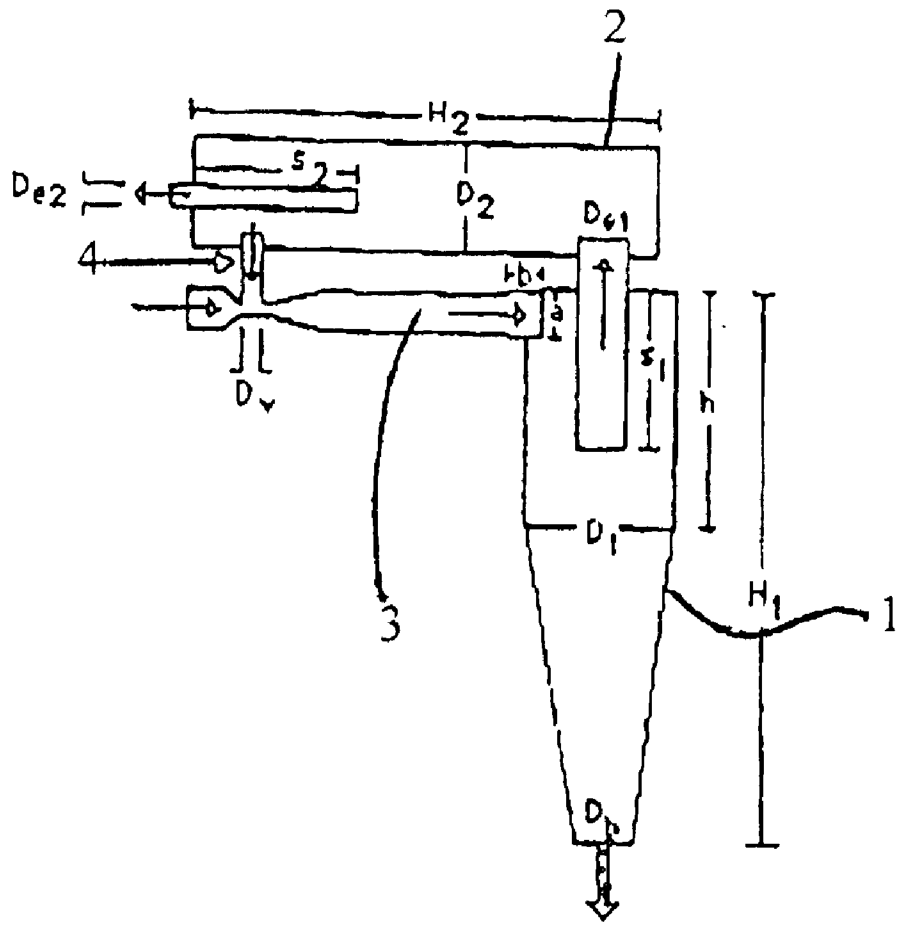
FIG. 1 is a schematic representation of a system, including a reverse-flow cyclone (collector)upstream of a straight-through cyclone (concentrator) and a re-circulation mechanism such as a fan, an ejector or a venturi.
Figure 2:
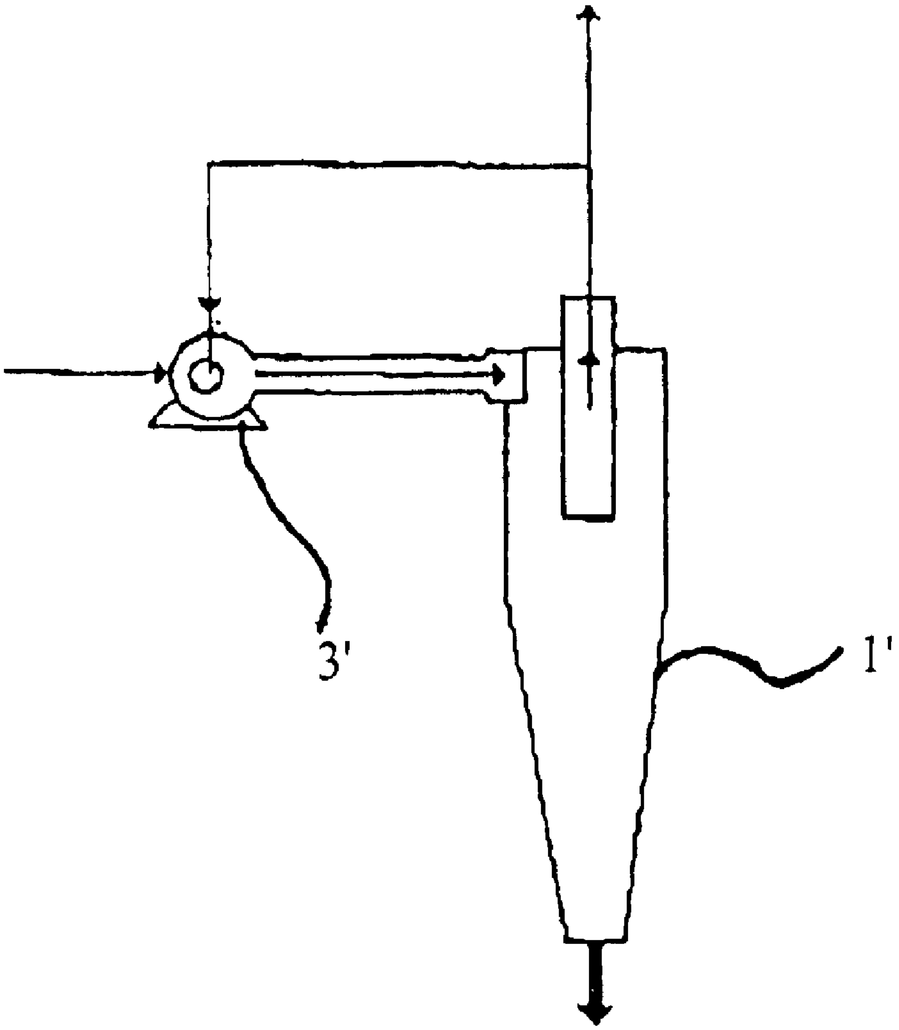
FIG. 2 (PRIOR ART)
FIG. 2 is a schematic representation of a prior art reverse-flow cyclone with re-cycling through a fan.
Figure 3:
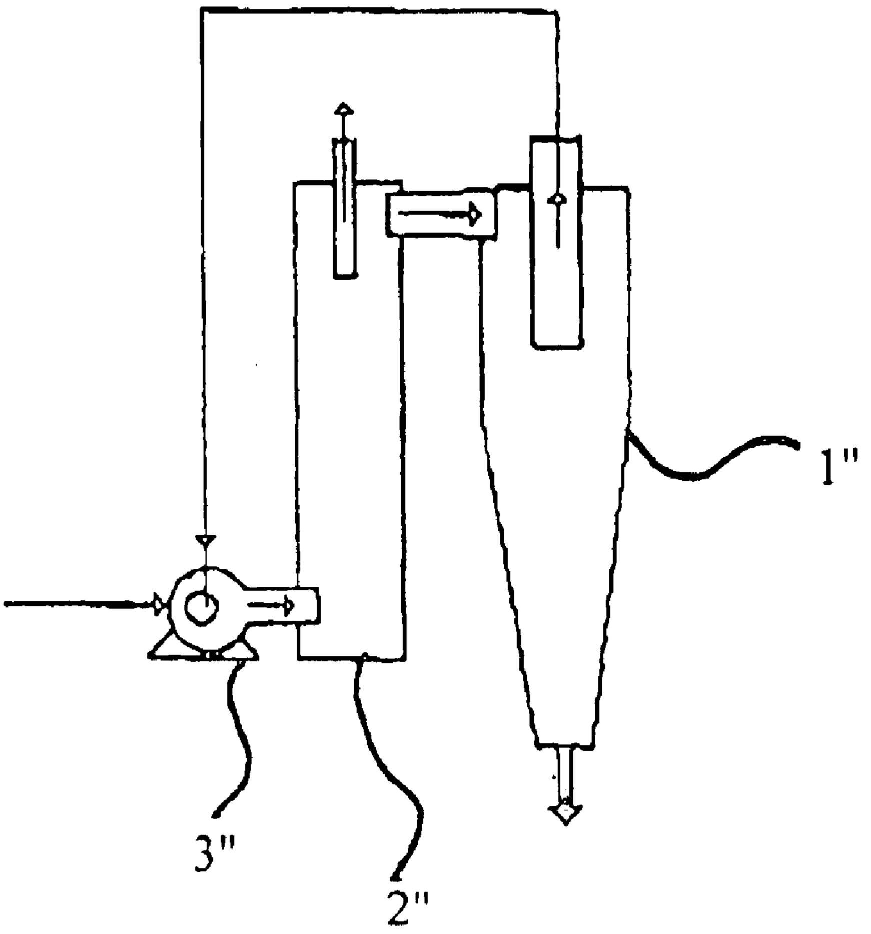
FIG. 3 (PRIOR ART)
FIG. 3 is a schematic representation of a prior art re-circulation system, including a straight-through cyclone (concentrator) upstream of a reverse-flow cyclone (collector), with re-circulation performed by a fan.
Figure 4:
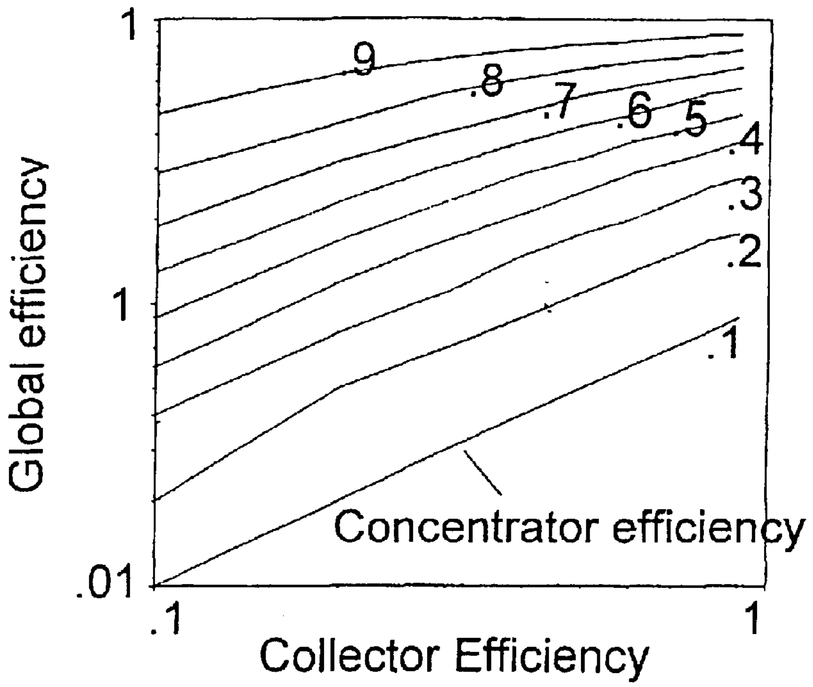
FIG. 4 shows global efficiency for the system depicted in FIG. 3.
Figure 5:
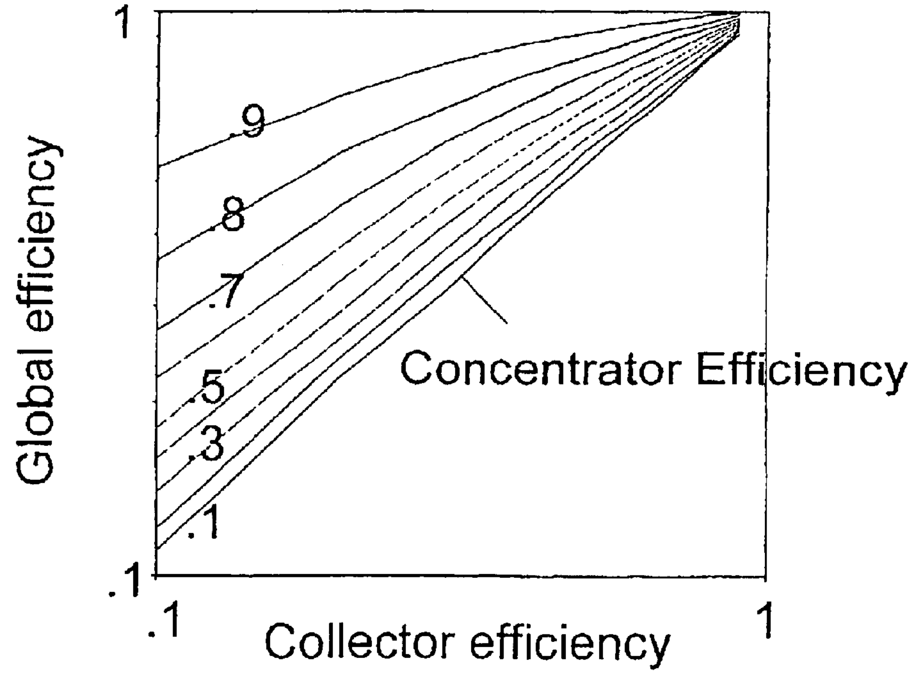
FIG. 5 shows global efficiency for the system depicted in FIG. 1.

A re-circulation system, that comprises two cyclones, one of a reverse-flow type (collector) 1 and the other a straight-through cyclone (concentrator) 2, is characterized by the collector being placed upstream of the concentrator, with partial re-circulation from the concentrator to the collector being made via a fan, a venturi or ejector (re-circulation mechanism) 3. The collector 1 has a rectangular tangential entry of dimensions a and b, with dimension a being parallel to a cyclone axis, or a circular section of an equivalent area; a body of height $H_1$ having an upper cylindrical portion of diameter $D_1$ and height h, and also having a lower inverted cone with a smaller base diameter $D_b$; and a cylindrical vortex finder of diameter $D_{e1}$ and height $s_1$. The cyclone concentrator 2 has a tangential entry of essentially circular section of diameter $D_{e1}$; a cylindrical body of height $H_2$ and diameter $D_2$; a cylindrical vortex finder of diameter $D_{e2}$ and length $s_2$; and two exits, one being tangential and essentially circular with diameter $D_v$, and the other being axial with diameter $D_{e2}$. The venturi 3, if this is the re-circulation mechanism employed, is any standard venturi type with adequate dimensions calculated by conventional methods.

The above components are related as follows: gas to be cleaned enters the reverse flow cyclone 1, which captures some particles; escaping particles follow with the gas to the straight-through cyclone (concentrator) 2, and part of the gas concentrated with uncaptured particles is re-cycled to the reverse flow cyclone by virtue of the fan, venturi or ejector 3.

Figure 6:
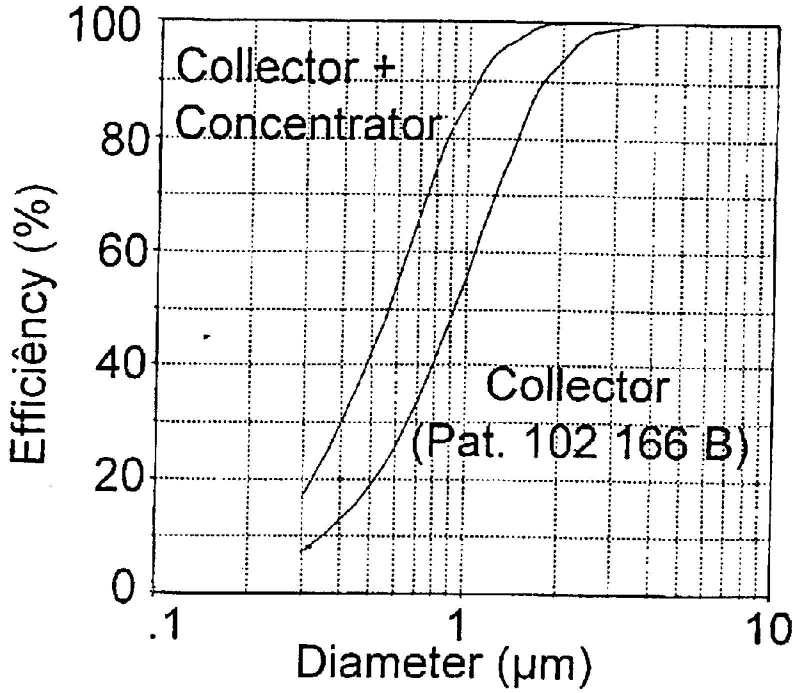
FIG. 6 compares grade-efficiencies of a single collector with that of the system depicted in FIG. 1, for laboratory-scale collectors and concentrators (0.02 m), gas flow rate of $3.3\times10^{-4}$ $m^3s^{-1}$ and unit density spherical particles.

To better understand these phenomena, the inventive system was modeled using the Mothes and Loffler (1998) theory, which is presently the best model available to predict cyclone performance (Clift et al., 1991; Salcedo, 1993; Salcedo and Fonseca, 1996; Hoffmann et al., 1996; Salcedo and Coelho, 2000). FIG. 6 shows predicted grade efficiency curves (efficiency for each particle size) for the inventive system, as compared with a single collector, for a laboratory-scale system, both treating the same particles and for the same gas flow rate, where decreases in emissions above 50% are expected.

The inventive system has the following characteristics that differentiate it from competing systems available in the marketplace:

- Efficiency always larger than that of a reverse flow cyclone with the same geometry and size as the collector;
- Efficiency always larger than that of re-circulation systems with a concentrator upstream of a collector, as long as geometries and sizes are comparable;
- Re-circulation through a fan, venturi or ejector.
- May be used either as de-dusters or as acid dry gas cleaning systems;
- May be used at high temperatures, provided a venturi or ejector is employed for re-circulation purposes;
- Absence of moving parts as long as a venturi or ejector is employed for re-circulation purposes.

Thus, the instant invention pertains to a system of two cyclones, used for de-dusting or dry gas cleaning, where a collector is a reverse-flow cyclone upstream from a straight-through cyclone concentrator, with partial re-circulation from the straight-through cyclone concentrator to the reverse-flow cyclone via a venturi, fan or ejector. The instant invention also pertains to a method of de-dusting or dry gas cleaning using the inventive system.

PRACTICAL EXAMPLES

Figure 7:
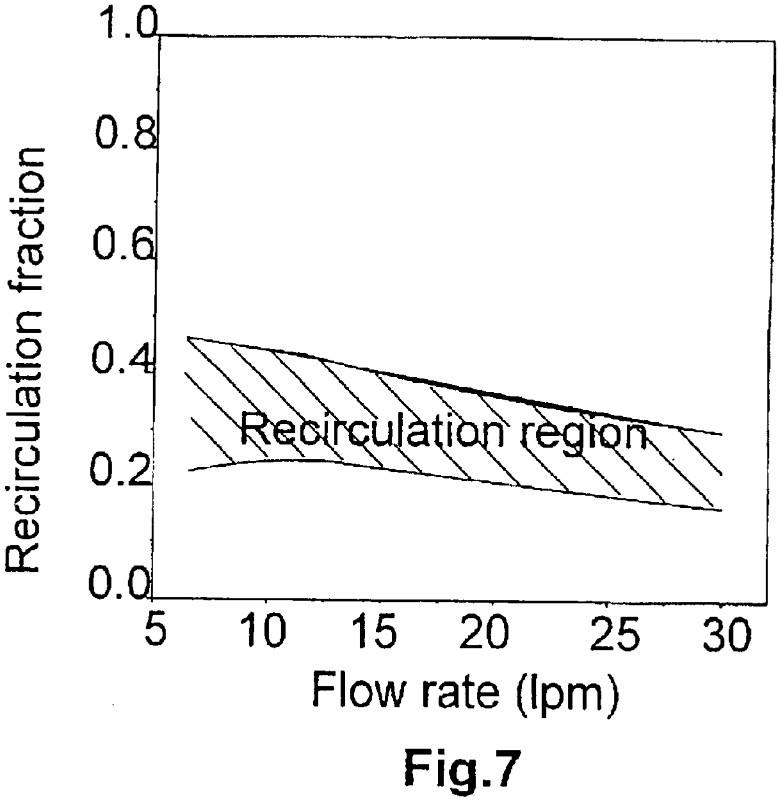
FIG. 7 shows that a venturi is capable of providing for significant re-circulation.

A laboratory-scale prototype was built to demonstrate re-circulation capabilities of a venturi, and this has been clearly shown (FIG. 7).

Thus, it is predicted that the inventive system may significantly reduce emissions when compared with single reverse-flow cyclones or with re-circulation systems with a concentrator located upstream of a collector. This has already been shown at a laboratory-scale, where a reverse-flow cyclone with a 0.02 m inside diameter and geometry according to patent PT102166 (which is referred in FIG. 6), has a collection efficiency of 80% for $Ca(OH)_2$ (lime) with 1.37 $\mu$m of mean mass diameter, at a gas flow rate of 20 $lmin^{-1}$.

Connecting to a collector a straight-through concentrator with a 0.02 m inside diameter and causing partial re-circulation from the concentrator to the collector via a venturi having a 0.002 m throat diameter, as per FIG. 1, results in collection efficiency increasing to 96%. Reductions in emissions of 80% (from 20 to 4%) are then possible. Thus, by using very high efficiency geometries for the collector (for example, that described in PT102166) allows the inventive system to compete with much more expensive de-dusters (spray and absorption towers, venturis, pulse jet bag filters), except with regard to extremely small particles (<0.5 $\mu$m), with an added advantage that the inventive system may be used at very high temperatures and for acid gas cleaning by dry injection of a solid sorbent. The sorbent can be introduced upstream of the reverse-flow cyclone 1 or the re-circulation mechanism 3 as indicated by arrow 4 in FIG. 1. Development of de-dusting systems collection efficiencies well above those associated with single reverse-flow cyclones, using simple and economical technologies, especially for particle sizes below 2–3 $\mu$m, has a great potential for industrial application. Several industries (wood, metals, cements, chemicals), and fuel boilers could benefit from economical and efficient de-dusters to avoid a need of using much more expensive devices, such as pulse jet bag filters.

Likewise, the automotive industry, as it refers to emissions control of particulates from diesel vehicles, could benefit from simple equipment such as the inventive system, which may be used at high temperatures and does not have moving parts.

The inventive system has also clear advantages over reactors usually employed for acid gas cleaning (HCl, HF and $SO_2$), where extremely compact and efficient units may be designed, both with regard to the removal of acid gases and a rate of use of solids injected as a dry powder, due to partial re-circulation of an unreacted sorbent.

References

Berezowski, M. and K. Warmuzinski, 'Recycling as a means of controlling the operation of cyclones', *Chemical Engineering and Processing*, vol.32, 345–347, 1993.

Carminati, A., A. Lancia, D. Pellegrini and G. Volpiccelli, 'Spray dryer absorption of HCl from flue gas', Proc. $7^{th}$ *World Clean Air Congr*., 426, 1986.

Clift, R., M. Ghadiri and A. C. Hoffman, 'A Critique of Two Models for Cyclone Performance', *AlChE J.*, vol.37, 285–289, 1991.

Crawford, M., '*Air Pollution Control Theory*', McGraw-Hill, 1976.

Fonseca, A. M., José J. Órfão and Romualdo L. Salcedo, 'Kinetic modeling of the reaction of HCl and solid lime at low temperatures', *Ind. Eng. Chem. Res.*, vol.37, 4570–4576, 1998.

Heap, B. M., 'The continuing evolution and development of the dry scrubbing process for the treatment of incinerator flue gases', *Filtr. Sep.*, vol. 33, 375, 1996.

Hoffmann, A. C., M. de Groot and A. Hospers, 'The effect of the dust collection system on the flowpattern and separation efficiency of a gas cyclone', *Can. J. Chem. Eng.*, vol.74, 464–470, 1996.

Licht, W., '*Air Pollution Control Engineering-basic calculations for particulate collection*', Marcel Dekker, New York and Basel, 1980.

Mothes, H. and F. Loffier, 'Prediction of particle removal in cyclone separators', *International Chemical Engineering*, vol. 28, 231–240, 1988.

Salcedo, R. L., 'Collection Efficiencies and Particle Size Distributions from Sampling Cyclones—Comparison of Recent Theories with Experimental Data', *Can. J. Chem. Eng.*, vol.71, 20–27, 1993.

Salcedo, R. L. and A. M. Fonseca, 'Grade-efficiencies and particle size distributions from sampling cyclones', *Mixed-Flow Hydrodynamics*, Cap. 23, 539–561, P. Cheremisinoff (ed.), Gulf Publishers, 1996.

Salcedo, R. L. and M. A. Coelho, 'Turbulent Dispersion Coefficients in Cyclone Flow: an empirical approach', *Can. J. Chem. Eng.*, August 2000.

Svarovsky, L., '*Solid-Gas separation*', Elsevier Scientific Publishing Co., N.Y. 1981.

Wysk, S. R., L. A. Smolensky and A. Murison, 'Novel particulate control device for industrial gas cleaning', *Filtration & Separation*, Jan./Feb., 29–31, 1993.

What is claimed:

1. A re-circulation system for de-dusting and dry gas cleaning, comprising:

a straight-through cyclone concentrator;

a reverse-flow cyclone collector upstream of said straight-through cyclone concentrator; and a re-circulation mechanism interconnecting said reverse-flow cyclone collector and said straight-through cyclone concentrator, such that when gas flows from said reverse-flow cyclone separator through said straight-through cyclone concentrator a portion of the gas is re-circulated by said re-circulation mechanism to said reverse-flow cyclone collector.

2. The re-circulation system according to claim 1, wherein said re-circulation mechanism comprises a fan.

3. The re-circulation system according to claim 1, wherein said re-circulation mechanism comprises an ejector.

4. The re-circulation system according to claim 1, wherein said re-circulation mechanism comprises a venturi.

5. A method of de-dusting or cleaning gas, comprising:

flowing gas through a reverse-flow cyclone collector;

flowing gas exiting from said reverse-flow cyclone collector through a straight-through cyclone concentrator; and using a re-circulation mechanism to re-circulate a portion of gas exiting from said straight-through cyclone concentrator to said reverse-flow cyclone collector.

6. The method according to claim 5, further comprising:

upstream of said reverse-flow cyclone collector or said re-circulation mechanism, injecting a solid sorbent into gas that is to flow through said reverse-flow cyclone collector.

7. The method according to claim 6, wherein said gas comprises an exhaust gas resulting from diesel combustion.

8. The method according to claim 5, wherein said gas comprises an exhaust gas resulting from diesel combustion.

9. The method according to claim 6, wherein said gas comprises an acidic gas.

10. The method according to claim 9, wherein said acidic gas comprises at least one of HCl, HF, $SO_2$ and $NO_x$.

11. The method according to claim 5, wherein said gas comprises an acidic gas.

12. The method according to claim 11, wherein said acidic gas comprises at least one of HCl, HF, $SO_2$ and $NO_x$.

* * * * *